May 31, 1960

D. C. GARLAND 2,938,484

TORPEDO LOADING BAND

Filed Aug. 29, 1957

DAVID C. GARLAND
*INVENTOR.*

BY

*ATTORNEYS*

May 31, 1960

D. C. GARLAND 2,938,484

TORPEDO LOADING BAND

Filed Aug. 29, 1957

DAVID C. GARLAND
INVENTOR.

BY

*J.D. O'Brien*
*V.C. Muller*
ATTORNEYS

United States Patent Office 2,938,484
Patented May 31, 1960

2,938,484

TORPEDO LOADING BAND

David C. Garland, Pine Grove Mills, Pa., assignor, by mesne assignments, to the United States of America as represented by the Secretary of the Navy Filed Aug. 29, 1957, Ser. No. 681,153

2 Claims. (Cl. 114—20)

This invention relates to torpedo hoisting mechanism and more particularly to a torpedo loading band adapted to be readily clamped about a torpedo and used in hoisting the torpedo during submarine loading operations and to be thereafter released and removed from the torpedo.

The invention particularly contemplates a structure that may be readily used to load torpedoes under the demanding hoisting conditions present in loading a torpedo into a submarine or removing it therefrom through the small loading hatches provided therefor.

Due to the fact that the forward and aft portions of a submarine are relatively small and that all loading hatches must be of minimum circular size for practical reasons, torpedoes cannot be horizontally or vertically loaded into a submarine and must be disposed at a fixed acute angle to the loading hatch and in this position, slid for its entire length into the submarine. The accepted procedure is to place the torpedo by means of a hoist on a ramp disposed at the required angle and extending interiorly of the submarine through the loading hatch at least the length of the torpedo being loaded. After the torpedo has been placed on the ramp it is very carefully slid through the loading hatch and thereafter transferred to a storage area. Due to the extremely restricted area of the loading hatch and the length and configuration of the torpedo being loaded, one of two methods may be used. If the torpedo is a short and small one, such as for example one weighing 1000–1500 lbs. or has spacer elements projecting from its outer cylindrical surface it is placed on a loading tray especially designed to receive and retain the torpedo and the loading tray and torpedo is allowed to slide through the loading hatch by slacking off on restraining lines connected to the loading tray. If the torpedo is of a larger diameter and length, such as for example one 21 inches in diameter and weighing 4000 lbs. or more, the loading tray must be eliminated and the restraining lines attached to the torpedo.

It has heretofore been the practice to connect the restraining lines to a heavy metal nose cap of a size less than the maximum diameter of the torpedo and adapted to fit over the front surface of the torpedo. If the torpedo being loaded has a conventional warhead, a retaining element is threaded into the exploder cavity to insure that the nose cap is maintained in position on the nose of the torpedo. Since the nose cap and retaining element must be of substantial size and weight for safety reasons they are awkward and difficult to handle and the use thereof quite often results in damage to the exploder cavity and/or mechanism or hydrophones in the case of a self-guided torpedo. The procedure for removing a torpedo from a submarine must, as a matter of necessity, be the reverse of the procedure for loading it on the submarine. The loading and unloading of torpedoes from submarines requires extreme care due to the inherent nature of a torpedo and the fact that there is only about one and one-half inches clearance between the torpedo and the loading hatch. For these reasons personnel are frequently injured during loading operations due to the inability to properly restrain the torpedo or the torpedo is damaged by contact with the loading hatch such that it is rendered inoperative or unsatisfactory for its intended use. This is especially true for torpedoes containing complex and sensitive self-guidance systems.

It may now be obvious that the space provided for receiving torpedoes in a submarine is extremely limited, thereby giving rise to imposing problems and difficulties. As pointed out hereinabove the torpedo must first be placed in a sling and hoisted by means of a winch or the like and placed on the ramp. The design of a submarine and the size of the loading hatches, as well as the weight and nature of torpedoes are factors that materially limit the space available for loading a torpedo on a submarine and make it a difficult and hazardous operation. The absence of any material clearance between the torpedo and the loading hatch imposes serious limitations on the satisfactory attachment of the restraining lines to the torpedo itself and has heretofore prevented the use of a structurally strong and universally operable band adapted to encircle and grip the torpedo and provide one or more points of attachment, for restraining lines, hoisting lines and the like.

The present invention is directed to providing an improved narrow, bifurcated band of minimum thickness and maximum structural strength that is adapted to removably encircle and securely grip the outer periphery of a torpedo and provide one or more points of attachment for securing lines to the torpedo when it is being loaded into or removed from a submarine. The invention overcomes the difficulties heretofore experienced in sliding a torpedo through a submarine loading hatch and requires but a single structure to meet all the requirements of such an operation.

A further object of the invention is to provide a very simple and efficient torpedo loading band of minimum thickness and maximum structural strength.

Another object of the invention is the provision of a new and improved loading band for torpedoes.

Still another object of the invention is the provision of a loading band for torpedoes for use in loading torpedoes into submarines that allows simplification of prior loading procedures and provides an additional degree of safety and convenience to personnel involved in the loading operation.

These and other objects and features of the invention, together with their incident advantages, will be more readily understood and appreciated from the following detailed description of the preferred embodiment thereof selected for purposes of illustration and shown in the accompanying drawings in which.

Figure 1:
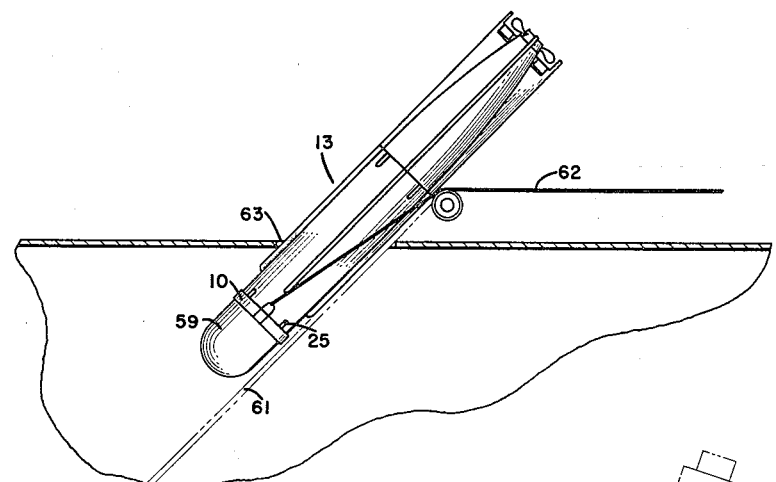
Figure 1 illustrates somewhat diagrammatically the manner in which a torpedo must be loaded into a submarine through a loading hatch in the deck and shows the loading band in position for such an operation.

As illustrated in the drawings, the torpedo loading band 10 includes two co-planar semi-circular bands 11—12 oppositely disposed to encircle a torpedo 13, hinge means 14 to pivotally connect two adjacent ends 15—16 of the bands 11—12, a plurality of inwardly projecting lugs 17 carried by the bands 11—12, an ear 18 integral with or fixedly connected to each band 11—12 intermediate its ends and extending in an outwardly and longitudinal direction, and take-up means 19 to draw the remaining oppositely disposed ends 21—22 of the bands 11—12 together. The bands are formed to have a circumference slightly less than that of the smallest torpedo with which they are to be used and are formed of relatively narrow strips of cold rolled steel or the like and of such thickness such as for example, one fourth inch, as to render them structurally strong and rigid such that they will not be deformed by forces exerted longitudinally or transversely to the bands 11—12. Provided on the inner surface 23—24 of each band are at least two inwardly projecting lugs 17, preferably of triangular cross section, disposed and adapted to fit in the peripheral connecting bolt wells 25 at the junction of separable torpedo body shell portions shown by way of example in Figure 1. If desired, the lugs 17 may be slidably mounted on the band to provide for different torpedo constructions wherein the radial location of the connecting bolt wells 25 may vary. Fixedly attached to or integral with each band is an ear or U-shaped element 18 extending past one edge of the band and extending slightly in an outwardly direction to allow a hoisting line or snubbing line 62 to be easily connected thereto. However, in order to allow the bands 11—12 to be used on a torpedo to be loaded on a submarine the ears 18 should not extend outwardly more than about one inch from the outer surface of the loading band.

In order to insure maximum structural strength and minimum thickness of the hinge 14 there is provided on the end portion of band 12 a solid steel block 26 having axial passages 33 formed in two ears 27—28 extending past the end of the band and forming a recess or slot 29 to freely receive a second block 31 integral with the end portion of the band 11 and having a passage 34 in axial alignment with the passages in the ears such that a pin 32 of substantial diameter may be passed through the passages 33—34 whereby the bands 11—12 may pivot outwardly about the pin 32.

Although other hinge arrangements will readily occur to those experienced in the art the hinge construction described hereinabove is considered superior and essential to provide a hinge for maximum structural strength and minimum thickness.

Figure 3:
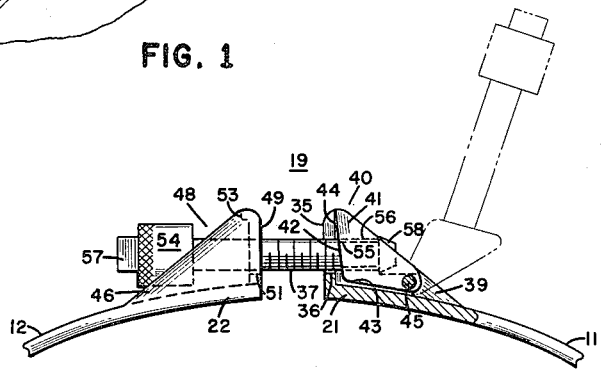
Figure 3 is a fragmentary side view, partially in section, showing in detail the take-up means for drawing the band elements together.
Figure 4:
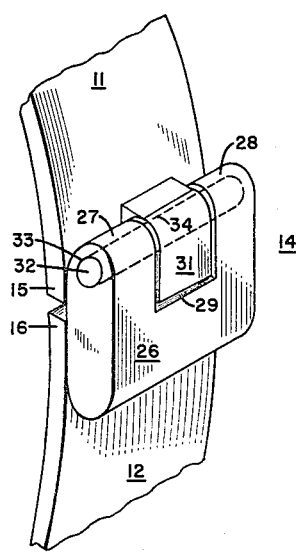
Figure 4 is a fragmentary isometric view showing the details of the hinge construction.
Figure 2:
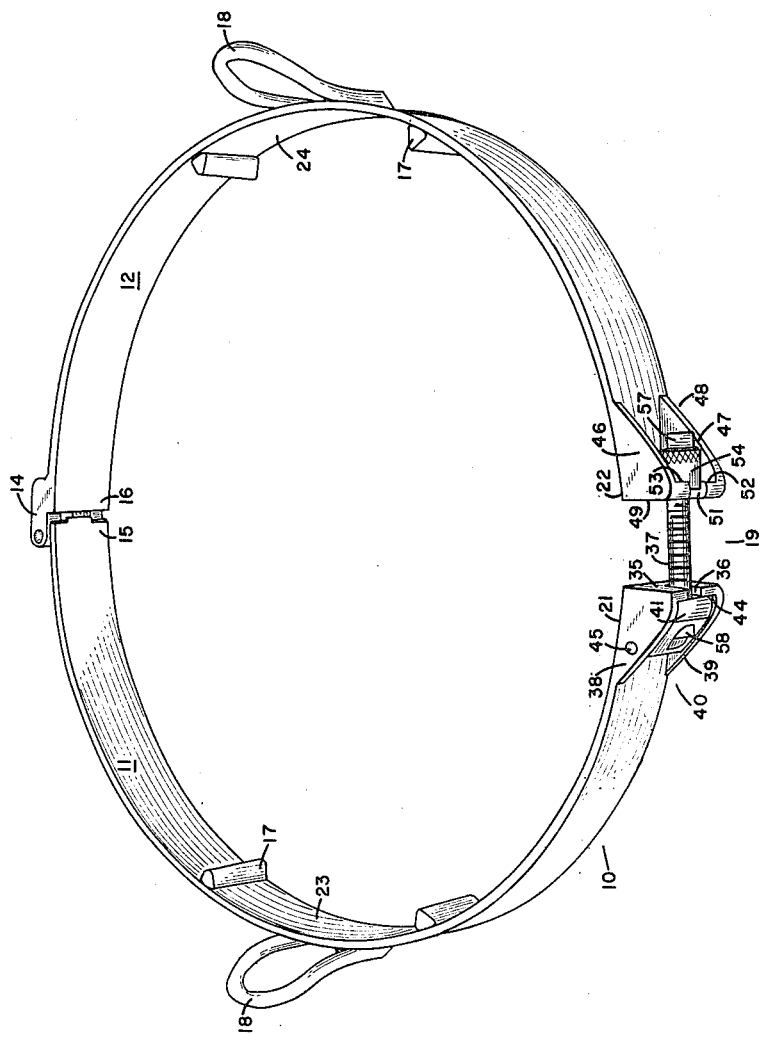
Figure 2 is a perspective view of the loading band.

Integral with the extreme end portion of band 11 is a wall 35 extending outwardly in a radial direction and provided with an inwardly extending recess or slot 36 adapted to freely receive a bolt 37 as described hereinafter. Two triangularly shaped ribs 38—39 integral at their shorter sides respectively with the radially disposed edges of the wall 35 and the longitudinal edges of the band provide reinforcement of the wall 35 and form a generally U-shaped socket 40 open on one side and having a substantially flat rectangular front surface formed by the wall 35 and flat triangularly shaped side surfaces formed by the ribs 38—39. A triangularly shaped solid retaining block 41 having its shortest sides 42—43 disposed for at least partial abutting relationship with the inner surface of wall 44 and the outer surface of the band 11 is arranged and adapted for pivotal movement into and out of the socket 40 by means of a relatively small pin 45 passing through and carried by the oppositely disposed rear portions of the ribs 38—39 and the rear portion of block 41 disposed therebetween. It is to be noted that the size of the pin 45 and its location in the ribs 38—39 and the block 41 need not be determined on the basis of structural strength and need only maintain the block in pivotal connection with the socket 40. Integral with the oppositely disposed end portion 22 of the band 12 and oppositely disposed to and facing the socket 40 is a substantially identical socket 48 comprised of a wall 49 facing wall 35 and having a recess 51 disposed in alignment with recess 36, rearwardly extending ribs 46—47 and additionally including rearwardly extending lips 52—53 integral with the upper surface of the wall 49. A bolt 37 having an enlarged head portion 54 and exteriorly threaded end portion 55 is threadably mounted in the solid block 41 by means of an internally threaded passage 56 lying in a plane tangential to the band 11 and in alignment with the recesses 36—51. When the block 41 is disposed in its operative position with the socket 40 as shown in Figure 3. The threaded portion of the bolt 37 is preferably of such length that under all operating conditions the enlarged head portion 54 may be disposed rearwardly of the lips 52—53 and will extend at least in part past the end portion of the socket 48, when placed in the position shown in solid lines in Figure 3. However, it is essential that the size and length of the bolt be limited such that when the bolt 37 is advanced through the block 41 to its maximum forward position it will at all times lie within a radial distance from the bands 11—12 not greater than the radial length of the walls 35—49 whereby the clearance necessary for use of the loading band 10 is maintained at a minimum and is determined by the radial thickness of the sockets 40—48.

As the bolt is advanced on its threads through the block 41 the enlarged head portion 54 is brought into locking engagement with the wall 49 and lips 52—53 and the block 41 is brought into locking engagement with the wall 35 and held against longitudinal or transverse movement by the socket 40 and the pin 45 pivotally connecting the rear portion of the block 41 to the rear portion of the socket 48. As indicated hereinabove the block 41 is pivotally carried in the socket 40 by a small pin 45 whereby the block may be swung into and out of the socket as shown in phantom in Figure 3. For maximum structural strength it is essential that at least the upper portion of the front surface of the block be in abutting relationship with the inner surface of the wall when the bolt is disposed in its locking position.

To facilitate tightening of the loading band 10 the head portion 54 of the bolt 37 may be provided with a projection 57 adapted to receive a wrench, socket or the like and the opposite end portion of the bolt may be provided with a radially extending cap 58 after it has been threaded through the block 41 to prevent separation of the bolt 37 from the band and possible loss thereof.

The loading band is simple and easy to use. For loading a torpedo on a submarine as shown by way of example in Figure 1, the loading band 10 may be attached to the forward portion 59 of the torpedo prior to placing it on the ramp 61 by opening the bands 11—12 to a sufficient distance that the end portions will pass around the torpedo and then bringing the end portions together such that each inwardly projecting lug 17 is received by and fits into a connecting bolt well 25 whereby the inner surfaces of the bands are in substantially continuous abutting engagement with the outer periphery of the torpedo. The bolt and block are then pivoted into their operative positions as shown in solid lines in Figure 3 such that the threaded portion of the bolt 37 is disposed in the recesses 36—51. The bolt is then advanced on its threads until the bands and lugs securely grip the torpedo and the enlarged head portion 54 and block 41 are in abutting and locked relationship respectively with the socket walls 49—35. It is to be noted that the bolt 37 in its locked position provides an exceptionally strong connection having a radial dimention no greater than that of the oppositely disposed socket walls 35—49. After attachment of the loading band 10 to the torpedo 13, restraining lines 62 or the like may be attached to the ears 18 and the torpedo placed on the ramp 61 and eased through the loading hatch 63 or, in the case of removal of a torpedo, drawn through the loading hatch by any convenient means.

It may now be apparent that the unique construction of the take-up means as described and shown herein provides a simple construction having a structural strength greater than other such devices and as great or greater than the bands or hinge described herein while being of a minimum size. Because of the necessity of a high degree of safety and the limiting factors discussed hereinbefore with regard to the loading of a torpedo in a submarine, the high structural strength and the minimum size of the take-up means (of the order of one inch) cannot be emphasized too strongly.

While the present invention has been described in its preferred embodiment, it is realized that modifications may be made and it is desired that it be understood that no limitations on the invention are intended other than may be imposed by the scope of the appended claims.

Having now disclosed my invention, what I claim as new and desire to secure by Letters Patent of the United States is:

1. A torpedo band assembly for raising and lowering torpedoes having circumferentially disposed connecting bolt wells through submarine loading hatches having minimum clearance comprising: a substantially rigid first semi-circular band section having a first end portion and second end portion; a second substantially rigid semi-circular band section oppositely disposed to said first band section and having a third end portion and a fourth end portion, said first and second band sections being adapted for mating relationship with the outer cylindrical surface of a torpedo; hinge means connecting said first and third band end portions; inwardly projecting lugs carried by said band sections, said lugs being disposed and adapted to fit within said connecting bolt wells whereby said band sections may be in substantially continuous abutting relationship with said torpedo; first and second cable fittings respectively integral with and disposed intermediate the ends of said first and second band sections, each said cable fitting being disposed transversely of its band section and having a U-shaped portion extending past and slightly outward from its said band section; a take-up bolt having an enlarged head portion and an externally threaded end portion; a first radially extending wall integral with said band fourth end portion having an inwardly extending slot; first and second rearwardly extending ribs integral with said first wall and said band end portion to form a first triangular socket for receiving and retaining said bolt and head portion; a second radially extending wall integral with said band second end portion, said second wall being oppositely disposed to said first wall and having an inwardly extending slot; third and fourth rearwardly extending ribs integral with said second wall and said band second end portion to form a second triangular socket; and a triangular retaining block carried in said second socket and disposed for pivotal movement toward and away from said second wall and having an internally threaded passage to receive said bolt threaded portion whereby said retaining block bears against said radially-extending wall when said bolt is in tension and said retaining block and said bolt may be pivoted into and out of said first and second sockets for drawing and holding said band sections about a torpedo.

2. A torpedo band assembly for use with torpedoes having circumferentially disposed connecting bolt wells comprising: rigid circumferential band sections adapted for mating relationship with the outer surface of a torpedo; hinge means carried at opposite ends of said band sections for pivotally connecting said band sections circumferentially about a torpedo; inwardly projecting lugs carried by said band sections, each said lug being adapted and disposed to fit within a connecting bolt well for maintaining said band sections in fixed and continuous abutting relationships with said torpedo; a cable fitting integral with at least one of said band sections, said cable fitting having a first portion transversely affixed to a band section and a U-shaped second portion integral with said first portion and extending past and slightly outward from said band section; and take-up means for drawing and holding said band sections about the topedo, said take-up means being comprised of a take-up bolt having an enlarged head portion integral with an externally threaded end portion, a first socket carried by one band section for receiving said bolt head portion, a second socket carried by another band section and oppositely disposed to said first socket for receiving the threaded portion of said take-up bolt, and a retaining block pivotally retained in said second socket and having an internally threaded passage to receive said threaded bolt portion whereby said retaining block bears against said second socket when said take-up bolt is in tension and said block and said bolt head portion may be brought into locking and abutting relationship respectively with said second socket and said first socket, said hinge, cable fitting, and take-up bolt each having such size and dimensions as to present when the band assembly is fully closed a radius not greater than that presented by the said sockets.

References Cited in the file of this patent
UNITED STATES PATENTS

| | | |
|---|---|---|
| 1,311,957 | Ferris | Aug. 5, 1919 |
| 1,826,947 | Nelson | Oct. 13, 1931 |
| 2,826,119 | Barrowman | Mar. 11, 1958 |

FOREIGN PATENTS

| | | |
|---|---|---|
| 557,582 | France | Aug. 11, 1923 |